(12) United States Patent
Yoshihara et al.

(10) Patent No.: US 10,742,093 B2
(45) Date of Patent: Aug. 11, 2020

(54) TEMPERATURE SENSOR

(71) Applicant: SHIBAURA ELECTRONICS CO., LTD., Saitama-shi, Saitama (JP)

(72) Inventors: Takamasa Yoshihara, Saitama (JP);
Michiru Takemura, Semboku (JP);
Masanori Kirihara, Semboku (JP)

(73) Assignee: SHIBAURA ELECTRONICS CO., LTD., Saitama-Shi, Saitama (JP)

( * ) Notice: Subject to any disclaimer, the term of this patent is extended or adjusted under 35 U.S.C. 154(b) by 170 days.

(21) Appl. No.: 15/769,642

(22) PCT Filed: Apr. 11, 2017

(86) PCT No.: PCT/JP2017/014848
§ 371 (c)(1),
(2) Date: Apr. 19, 2018

(87) PCT Pub. No.: WO2018/189813
PCT Pub. Date: Oct. 18, 2018

(65) Prior Publication Data
US 2019/0267871 A1 Aug. 29, 2019

(51) Int. Cl.
*H02K 11/25* (2016.01)
*G01K 1/14* (2006.01)
*H02K 5/08* (2006.01)

(52) U.S. Cl.
CPC ............... *H02K 11/25* (2016.01); *G01K 1/14* (2013.01); *H02K 5/08* (2013.01); *Y02T 10/641* (2013.01)

(58) Field of Classification Search
CPC .......... H02K 11/25; H02K 11/20; H02K 5/08; H02K 5/04; G01K 1/14; Y02T 10/641
(Continued)

(56) References Cited

U.S. PATENT DOCUMENTS

2011/0285218 A1* 11/2011 Tsubakimoto ......... H02K 11/25
310/50
2012/0043863 A1* 2/2012 Takahashi .............. G01K 13/08
310/68 C
(Continued)

FOREIGN PATENT DOCUMENTS

JP 2004354239 A 12/2004
JP 2011254628 A 12/2011
(Continued)

OTHER PUBLICATIONS

Machine translation of JP-2017026521-A. (Year: 2017).*
European Extended Search Report for PCT/JP2017/014848 dated Jan. 24, 2020.

*Primary Examiner* — Michael Andrews
(74) *Attorney, Agent, or Firm* — Pearne & Gordon LLP

(57) ABSTRACT

A temperature sensor 1 according to the present invention includes a first coil element 11 and a second coil element 12 both serving as a part of a coil of an electric apparatus, an element main body 53 that includes a thermosensitive body 54 detecting temperature of the first coil element 11 and temperature of the second coil element 12 and a pair of extraction wires 56 and 56 connected to the thermosensitive body 54, and a housing 25 that includes an electric insulating resin material and is configured to house and hold the first coil element 11, the second coil element 12, and the element main body 53.

16 Claims, 9 Drawing Sheets

(58) Field of Classification Search
USPC .......................................................... 310/68 C
See application file for complete search history.

(56) References Cited

U.S. PATENT DOCUMENTS

2017/0016777 A1* 1/2017 Yoshihara ................ G01K 7/22
2018/0017446 A1   1/2018 Yoshihara et al.

FOREIGN PATENT DOCUMENTS

| JP | 2012-044773 A |   | 3/2012 |
|----|---------------|---|--------|
| JP | 2017-26521 A  |   | 2/2017 |
| JP | 2017026521 A  | * | 2/2017 |
| WO | 2016120929 A1 |   | 8/2016 |

* cited by examiner

TEMPERATURE SENSOR

This is a National Stage application of PCT international application PCT/JP2017/014848, filed on Apr. 11, 2017, which is incorporated herein by reference in its entirety.

TECHNICAL FIELD

The present invention relates to a temperature sensor suitable for detecting, for example, temperature of a stator coil of a stator in a rotating machine.

BACKGROUND ART

Temperature of a stator coil provided in a stator of a rotating machine is increased when a current flows through the stator coil. To avoid excessive temperature increase of the stator coil to stably operate the rotating machine, the temperature of the stator coil is detected with use of a temperature sensor. In the following, the stator coil is also simply referred to as a coil.

Patent Literature 1 provides a temperature sensor that makes it possible to prevent positional displacement of a temperature detection element while suppressing stress applied to the temperature detection element. The temperature sensor includes a first holder fixed to a coil element and including a housing chamber that houses a thermosensitive body of the temperature detection element, and a second holder fixed to the coil element to prevent positional displacement relative to the first holder and holding a lead wire of the temperature detection element. A part of the thermosensitive body exposed from the housing chamber comes into contact with a surface of the coil element. The coil element is electrically connected to the coil of the rotating machine.

The temperature sensor disclosed in Patent Literature 1 covers and hides the thermosensitive body including the first holder and the second holder, with a resin mold.

CITATION LIST

Patent Literature

Patent Literature 1: JP 2017-26521 A

SUMMARY OF INVENTION

Technical Problem

In the rotating machine, it is desirable to detect temperature of two different coils in some cases. The temperature sensor disclosed in Patent Literature 1 has a reasonable dimension in an upright direction because the thermosensitive body stands upright on a thermosensitive surface of the coil element. For example, assuming the rotating machine of an electric vehicle, however, a space for the temperature sensor is not sufficient around the rotating machine. Therefore, it is not possible to provide two temperature sensors disclosed in Patent Literature 1 in some cases.

Accordingly, an object of the present invention is to provide a temperature sensor that makes it possible to save a space necessary for measurement of temperature of two coils.

Solution to Problem

A temperature sensor according to the present invention includes a first coil element and a second coil element both serving as a part of a coil of an electric apparatus, an element main body that includes a thermosensitive body detecting temperature of the first coil element and temperature of the second coil element, and a pair of electric wires connected to the thermosensitive body, and a housing that includes an electric insulating resin material, and is configured to house and hold the first coil element, the second coil element, and the element main body.

The temperature sensor according to the present invention may include, as the element main body, a first element main body detecting the temperature of the first coil element, and a second element main body detecting the temperature of the second coil element.

In the temperature sensor according to the present invention, the first coil element and the second coil element each include a rectangular cross-section, and respectively include a first counter surface and a second counter surface that face each other. In a case where the two element main bodies are provided, the first element main body may be provided corresponding to any surface of the first coil element other than the first counter surface, and the second element main body may be provided corresponding to any surface of the second coil element other than the second counter surface.

In the temperature sensor, the first element main body is preferably provided corresponding to a surface on rear side of the first counter surface, and the second element main body is preferably provided corresponding to a surface on rear side of the second counter surface.

The housing in the temperature sensor preferably includes a partition that electrically insulates the first coil element and the second coil element from each other.

The temperature sensor according to the present invention may include one element main body between the first counter surface and the second counter surface.

The housing in the temperature sensor according to the present invention preferably includes, at a position corresponding to the thermosensitive body, a view window allowing for visual confirmation of the thermosensitive body from outside.

In a case where the housing according to the present invention includes a first housing and a second housing both configuring the housing, the view window may be provided on one or both of the first housing and the second housing.

In a case where the second housing includes a resin molded body with respect to the first housing, the view window is preferably provided in the second housing.

The temperature sensor according to the present invention preferably further includes a covering body that includes a transparent resin and closely covers the thermosensitive body and a part of the electric wires, and the view window is preferably provided at a position corresponding to the thermosensitive body covered with the covering body.

In the temperature sensor according to the present invention, in a case where the element main body includes the first element main body detecting the temperature of the first coil element and the second element main body detecting the temperature of the second coil element, the view window may be provided corresponding to each of the thermosensitive body of the first element main body and the thermosensitive body of the second element main body.

Advantageous Effects of Invention

According to a temperature sensor 1 of the present invention, the first coil element and the second coil element are consolidated in one sensor assembly 20. This makes it possible to save an occupied space, as compared with a case where separate sensor assemblies are provided for the first coil element and the second coil element.

DESCRIPTION OF EMBODIMENT

An embodiment of the present invention is described below with reference to accompanying drawings.

Figure 1:
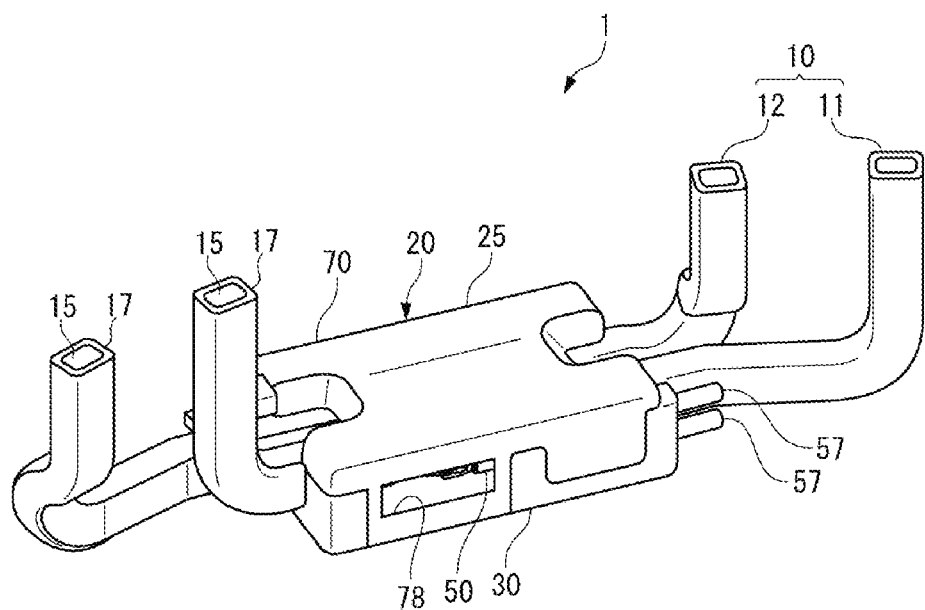
FIG. 1 is a perspective view illustrating a temperature sensor according to an embodiment of the present invention.
Figure 1:
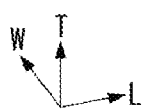
Figure 2A:
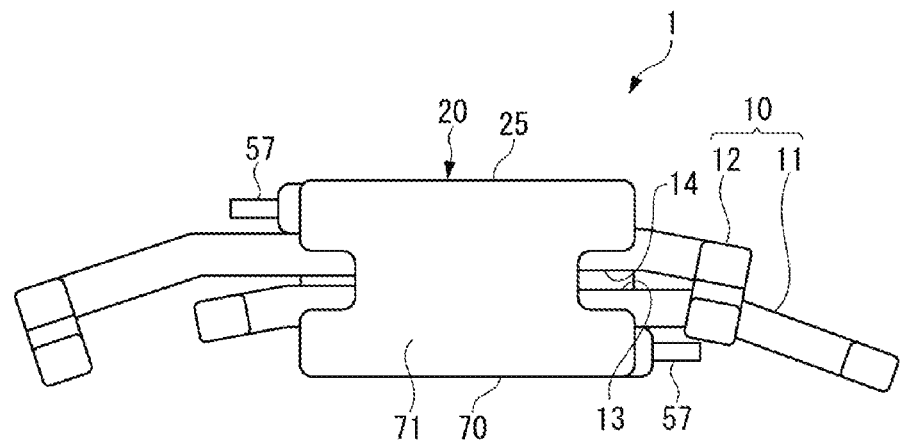
FIGS. 2A and 2B each illustrate the temperature sensor according to the present embodiment, FIG. 2A being a plan view, and FIG. 2B being a bottom view.
Figure 2B:
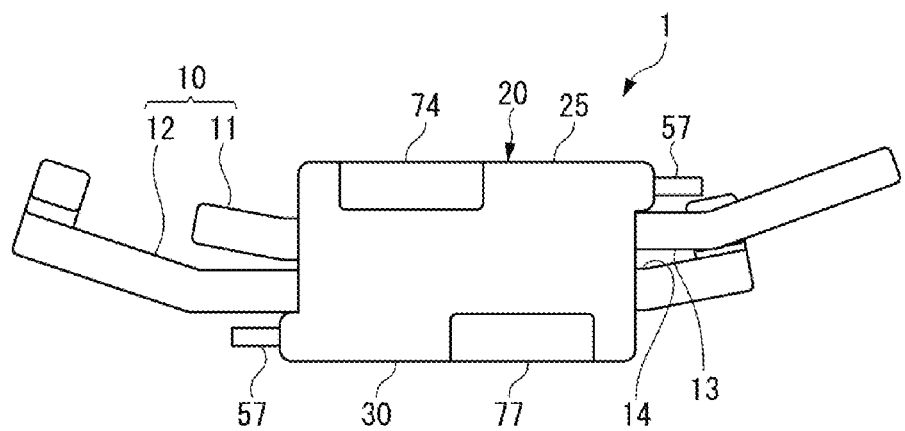
Figure 3A:
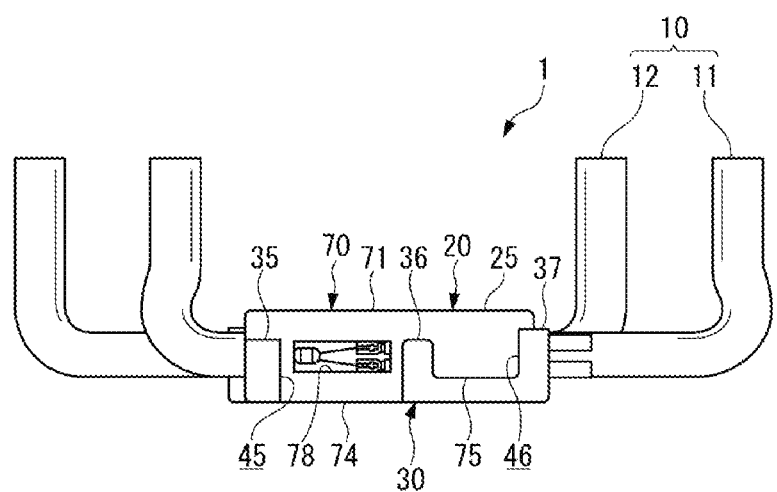
FIGS. 3A and 3B each illustrate the temperature sensor according to the present embodiment, FIG. 3A being a front view, and FIG. 3B being a rear view.
Figure 3B:
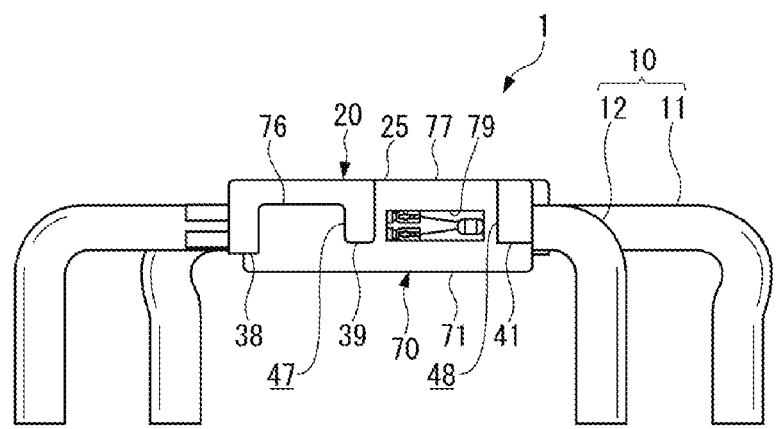

As illustrated in FIG. 1, FIGS. 3A and 3B, a temperature sensor 1 according to the present embodiment includes a coil element 10 (first coil element 11 and second coil element 12) and a sensor assembly 20 to be fixed to the coil element 10. A thermosensitive body 54 (FIG. 6B) included in the sensor assembly 20 detects temperature of the coil element 10. The coil element 10 includes a rectangular cross-section.

In the temperature sensor 1, the coil element 10 is electrically connected to a coil configuring a stator of a rotating machine not illustrated, to configure a part of the coil, and the sensor assembly 20 detects the temperature of the coil element 10 to detect temperature of the coil of the rotating machine.

In the temperature sensor 1, the two coil elements of the first coil element 11 and the second coil element 12 are fixed to one sensor assembly 20, which achieves effects of space saving and excellent vibration resistance.

In the following, a configuration of the temperature sensor 1 is sequentially described, and the effects of the temperature sensor 1 are thereafter described.

[Coil Element 10]

The coil element 10 configures, together with the sensor assembly 20, the temperature sensor 1.

In the present embodiment, as illustrated in FIG. 1, the coil element 10 includes the two coil elements of the first coil element 11 and the second coil element 12. The first coil element 11 and the second coil element 12 are different in installation positions in the sensor assembly 20 but have the same configuration. Accordingly, the configuration of the first coil element 11 is described below as an example.

As illustrated in FIG. 1, the first coil element 11 includes a rectangular wire that includes a conductor 15 and an electrically insulating covering 17 that covers a surface of the conductor 15.

The first coil element 11 includes a detection surface 16 (FIGS. 5A and 5B) comprising a flat surface, and the detection surface 16 comes into surface contact with a detection surface 65 (FIG. 6A) of a covering body 60 inside a housing 25.

In the first coil element 11, both ends of the conductor 15 are electrically connected to the coil that configures the stator of the rotating machine as an electric apparatus, thereby serving as a part of a stator coil.

The first coil element 11 is housed in and held by the housing 25 except for the both ends.

Note that, in the following, the first coil element 11 and the second coil element 12 are collectively referred to as the coil element 10 when it is unnecessary to distinguish the first coil element 11 and the second coil element 12.

[Sensor Assembly 20]

As illustrated in FIG. 1, the sensor assembly 20 includes the housing 25 and a sensor intermediate body 50 (FIGS. 6A and 6B) that is housed in the housing 25. The housing 25 includes a first housing 30 and a second housing 70, and covers and hides the sensor intermediate body 50. The second housing 70 includes a resin molded body that is previously formed through injection molding with respect to the first housing 30 housing the coil element 10 and the sensor intermediate body 50. Note that, as illustrated in FIG. 4C, the sensor intermediate body 50 includes a first sensor intermediate body 51 and a second sensor intermediate body 52.

In the sensor assembly 20, when the coil element 10 is fixed to a predetermined position, the thermosensitive body 54 is positioned at a predetermined position on the detection surface 16 of the coil element 10.

[First Housing 30]

Figure 4A:
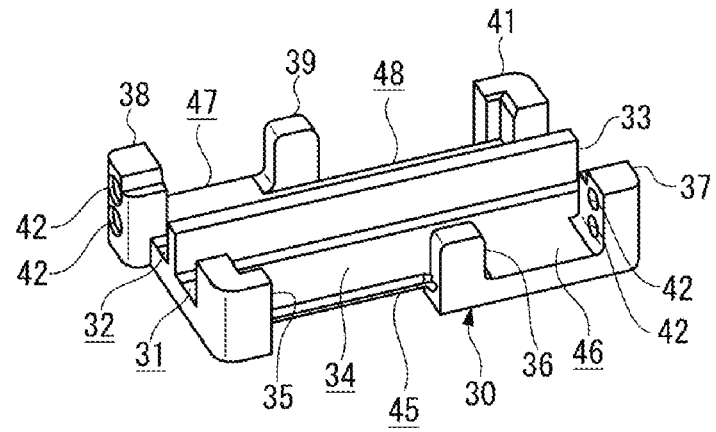
FIGS. 4A to 4C are perspective views illustrating a procedure of manufacturing the temperature sensor according to the present embodiment, FIG. 4A illustrating a single first housing, and FIGS. 4B and 4C illustrating a state where sensor intermediate bodies are sequentially assembled to the first housing.

As illustrated in FIG. 4A, the first housing 30 includes a first holding groove 31 and a second holding groove 32 that penetrate through the first housing 30 in a longitudinal direction L. The first holding groove 31 holds the first coil element 11 and the first sensor intermediate body 51, and the second holding groove 32 holds the second coil element 12 and the second sensor intermediate body 52.

The first housing 30 is integrally molded through injection molding of an electrically insulating resin material. As the resin material, for example, polyphenylene sulfide (PPS) resin and polyamide (PA) resin may be used. The second housing 70 is made from the same resin material. The resin material configuring the first housing 30 and the second housing 70 has rigidity higher than rigidity of a fluorine resin configuring the covering body 60 that covers a part of the sensor intermediate body 50. Accordingly, the sensor assembly 20 is firmly fixed to the coil element 10.

As illustrated in FIG. 4A, the first housing 30 includes a partition 33 between the first holding groove 31 and the second holding groove 32. The partition 33 electrically insulates the first coil element 11 and the second coil element 12 from each other.

The first housing 30 includes a bottom floor 34 and six supporters 35, 36, 37, 38, 39, and 41 that perpendicularly stand on a peripheral edge of the bottom floor 34. The supporters 35, 36, and 37 are provided with a predetermined gap from the partition 33 with the first holding groove 31 in between. In addition, the supporters 38, 39, and 41 are provided with a predetermined gap from the partition 33 with the second holding groove 32 in between.

The supporters 35, 36, and 37 are arranged in line with predetermined gaps in the longitudinal direction L at one edge of the first housing 30 in a width direction W. A view window 78 (FIG. 3A) described later is disposed between the supporter 35 and the supporter 36.

Further, the supporters 38, 39, and 41 are arranged in line with predetermined gaps in the longitudinal direction L on the other edge of the first housing 30 in the width direction W. A view window 79 (FIG. 3B) described later is disposed between the supporter 39 and the supporter 41.

As illustrated in FIG. 4A, the supporter 35 and the supporter 41 are respectively provided at one end and the other end of the first housing 30 in the longitudinal direction L.

The supporter 35 abuts on the first coil element 11 housed in the first holding groove 31, thereby supporting the first coil element 11 together with the partition 33 in the width direction W. In addition, the supporter 36 abuts on the first sensor intermediate body 51 housed in the first holding groove 31, thereby supporting the first sensor intermediate body 51 together with the supporter 37.

The supporter 41 is different in position from the supporter 35 but acts to support the second sensor intermediate body 52 in a similar manner. Therefore, further description of the supporter 41 is omitted.

As illustrated in FIG. 4A, the supporter 37 is provided at one end and the other end of the first housing 30 in the longitudinal direction L.

Each of the supporter 37 and the supporter 38 includes electric wire holding holes 42 and 42 into which lead wires 57 and 57 drawn from the first sensor intermediate body 51 are respectively inserted. The electric wire holding holes 42 and 42 penetrate through each of the supporter 37 and the supporter 38 in the longitudinal direction L.

The supporter 38 is different in position from the supporter 37 but acts to support the second sensor intermediate body 52 in a similar manner. Therefore, further description of the supporter 38 is omitted.

As illustrated in FIG. 4A, the supporter 36 is provided between the supporter 35 and the supporter 37. The supporter 36 supports, together with the partition 33, the sensor intermediate body 50 and the coil element 10 in the width direction W.

The supporter 39 is different in position from the supporter 36 but acts to support the second sensor intermediate body 52 in a similar manner. Therefore, further description of the supporter 39 is omitted.

As illustrated in FIG. 4A, the first housing 30 includes a gap 45 between the supporter 35 and the supporter 36, and a gap 46 between the supporter 36 and the supporter 37. In addition, the first housing 30 includes a gap 47 between the supporter 38 and the supporter 39, and a gap 48 between the supporter 39 and the supporter 41.

As illustrated in FIGS. 3A and 3B, a first locking part 74, a second locking part 75, a third locking part 76, and a fourth locking part 77 of the second housing 70 are respectively buried in the gaps 45, 46, 47, and 48. Among them, the view windows 78 and 79 are respectively provided in the first locking part 74 and the fourth locking part 77.

[Sensor Intermediate body 50]

Figure 6A:
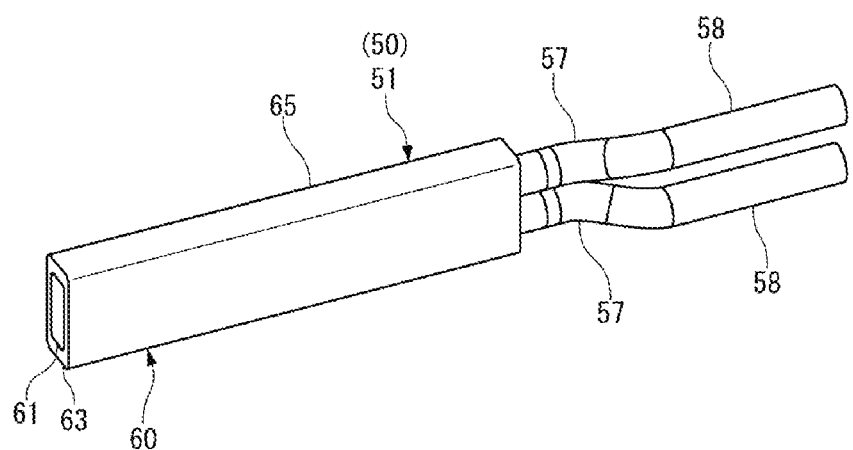
FIGS. 6A and 6B are perspective views illustrating the sensor intermediate body included in the temperature sensor of FIG. 1, FIG. 6A illustrating an outer shape thereof, and FIG. 6B illustrating an inside thereof in a transparent manner.
Figure 6B:
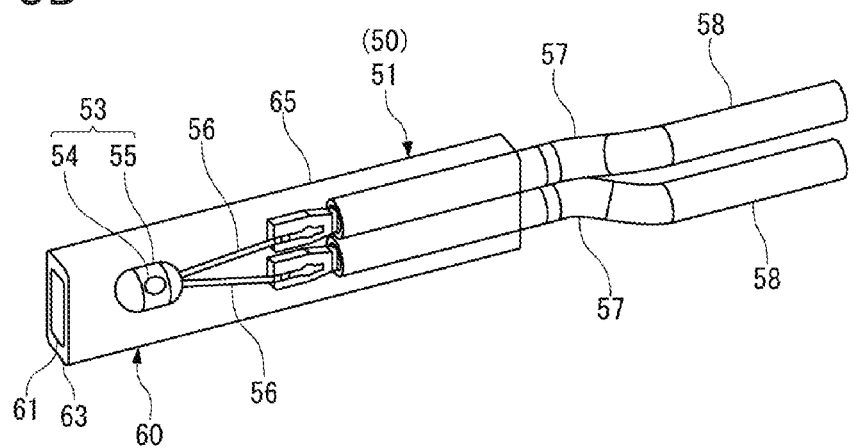

As illustrated in FIG. 6B, the first sensor intermediate body 51 includes an element main body 53, a pair of extraction wires 56 and 56, and lead wires 57 and 57. The pair of extraction wires 56 and 56 are electrically connected to the element main body 53. The lead wires 57 and 57 are respectively electrically connected to the extraction wires 56 and 56. The second sensor intermediate body 52 includes a configuration similar to the configuration of the first sensor intermediate body 51, and therefore description of the second sensor intermediate body 52 is omitted. Note that the element main body 53 included in the first sensor intermediate body 51 corresponds to a first element main body of the present invention, and the element main body 53 included in the second sensor intermediate body 52 corresponds to a second element main body of the present invention.

The element main body 53 is a cylindrical member that includes the thermosensitive body 54 having temperature characteristics in electric resistance, and a sealing glass 55 covering surroundings of the thermosensitive body 54.

The thermosensitive body 54 includes, for example, a material having temperature characteristics in electric resistance, like a thermistor.

The sealing glass 55 is provided to seal and maintain the thermosensitive body 54 in an airtight state, thereby preventing chemical change and physical change based on an environmental condition from occurring on the thermosensitive body 54. Amorphous glass and crystalline glass are both usable as the sealing glass 55, or the amorphous glass and the crystalline glass are mixed so as to have a desired linear expansion coefficient and such a mixture may be used as the sealing glass 55.

The extraction wires 56 and 56 each include, for example, Dumet wire, and are electrically connected to the thermosensitive body 54 through an unillustrated electrode. The Dumet wire includes an inner layer and an outer layer provided around the inner layer. The inner layer contains an iron-nickel alloy having a linear expansion coefficient close to that of glass, and the outer layer is cladded with copper or a copper alloy having high electroconductivity.

In addition, each of the lead wires 57 and 57 respectively includes a twisted wire in which thin core wires are twisted, and an electrically insulating covering layer 58 covering the twisted wire, and is bonded to the corresponding extraction wire 56 through welding. The lead wires 57 and 57 are connected to an unillustrated temperature measurement circuit through other electric wires as necessary. Note that the covering layers 58 and 58 each contain a fluorine resin such as polytetrafluoroethylene (PTFE) and a tetrafluoroethylene-perfluoroalkylvinylether copolymer (PFA).

In addition, as illustrated in FIGS. 6A and 6B, in the first sensor intermediate body 51, the whole of the element main body 53 and the extraction wires 56 and 56 and a part of the lead wires 57 and 57 are covered with the electrically insulating covering body 60, and the element main body 53 is protected from the surrounding environment.

The covering body 60 includes a substantially rectangular parallelepiped shape, and includes an inner layer 61 and an outer layer 63.

The inner layer 61 is disposed inside the outer layer 63, and directly covers the element main body 53. The inner layer 61 air-tightly seals a portion from a front end of the element main body 53 to the middle of the lead wires 57 and 57.

The inner layer 61 is formed of a fluorine resin containing a tetrafluoroethylene-perfluoroalkylvinylether copolymer (PFA). The PTFE forming the outer layer 63 and the PFA are fluorine resins and have excellent resistance in common; however, the PTFE has a melting point higher than that of the PFA. In addition, the PTFE and the PFA both include transparency, and in particular, the PFA include high transparency.

Further, the outer layer 63 is provided in close contact with outside of the inner layer 61.

The outer layer 63 provides, together with the inner layer 61, resistance to the element main body 53, and holds the inner layer 61 that is melted in a manufacturing process. Accordingly, the outer layer 63 contains the PTFE that has a melting point higher than that of the PFA forming the inner layer 61.

The outer layer 63 includes the flat detection surface 65, and the detection surface 65 comes into contact with the flat detection surface 16 of the coil element 10. As a result, the covering body 60 and the coil element 10 come into surface contact with each other.

The covering body 60 is fabricated by preparing an inner layer tube corresponding to the inner layer 61 and an outer layer tube corresponding to the outer layer 63, inserting the element main body 53 into the inner layer tube and disposing the outer layer tube on the outside of the inner layer tube, and performing heating and pressurization.

The melting point of the PFA configuring the inner layer tube is 302° C. to 310° C. whereas the melting point of the PTFE configuring the outer layer tube is 327° C. Therefore, if both are heated to, for example, 315° C., the inner layer tube is melted but the outer layer tube is not melted and can maintain its shape. The outer layer tube, however, contracts when heated to this temperature. The PTFE includes a linear expansion coefficient of about $10 \times 10^{-5}/°$ C., and strongly compresses the inner layer tube in the melted state. This contributes to densification of the inner layer 61, and airtightness between the inner layer 61 and the outer layer 63 is secured by pressure generated therebetween.

Press working is performed with use of a mold having a rectangular parallelepiped cavity while the inner layer tube is melted, which results in the rectangular parallelepiped covering body 60.

In the present embodiment, a transparent fluorine resin is used as the covering body 60. This allows for visual confirmation of soundness of the element main body 53 buried inside the covering body 60 through the view window 78 (79). In addition, the fluorine resin is rich in elasticity as compared with other resin materials. Accordingly, even if the coil element 10 as a temperature detection object vibrates, the covering body 60 follows the vibration and is tightly pressed against the coil element 10.

[Second Housing 70]

As illustrated in FIG. 1 and FIG. 3A, the second housing 70 covers and hides the coil element 10 and the sensor intermediate body 50 that are housed in the first housing 30, from a thickness direction T, and holds, together with the first housing 30, the coil element 10 and the sensor intermediate body 50.

As illustrated in FIGS. 3A and 3B and FIG. 4A, the second housing 70 includes a base part 71 that covers and hides the first holding groove 31 and the second holding groove 32. In addition, the second housing 70 includes the first locking part 74 and the second locking part 75. The first locking part 74 communicates with the base part 71 and fills the gap 45 between the supporter 35 and the supporter 36. The second locking part 75 communicates with the base part 71 and fills the gap 46 between the supporter 36 and the supporter 37. Further, the second housing 70 includes the third locking part 76 and the fourth locking part 77. The third locking part 76 communicates with the base part 71 and fills the gap 47 between the supporter 38 and the supporter 39. The fourth locking part 77 communicates with the base part 71 and fills the gap 48 between the supporter 39 and the supporter 41.

As illustrated in FIGS. 2A, 2B and FIGS. 3A, 3B, the base part 71, the first locking part 74, the second locking part 75, the third locking part 76, and the fourth locking part 77 that are integrally formed are locked in the first housing 30. Therefore, the second housing 70 is firmly fixed to the first housing 30 so as not to be displaced in position from each other.

As illustrated in FIGS. 3A and 3B, the second housing 70 includes the view window 78 in the first locking part 74, and the view window 79 in the fourth locking part 77.

The view window 78 penetrates front and rear surfaces of the first locking part 74, and is provided corresponding to a position at which the thermosensitive body 54 to be housed in the first holding groove 31 is disposed. The element main body 53 is covered with the covering body 60. The covering body 60, however, has high transparency, and accordingly, the thermosensitive body 54 and the sealing glass 55 are visually confirmed through the view window 78. In addition, a bonded part of the extraction wire 56 and the lead wire 57 through welding is also visually confirmed through the view window 78. As described above, the view window 78 is open corresponding to a range allowing for visual confirmation of a portion from the thermosensitive body 54 to the bonded part. The view window 79 is provided in a similar manner, and the thermosensitive body 54, the sealing glass 55, and the like are visually confirmable through the view window 79.

[Manufacturing Procedure]

Next, a procedure of manufacturing the temperature sensor 1 is described with reference to FIG. 4A and FIG. 5C.

As illustrated in FIG. 4A, the first housing 30 fabricated through injection molding is prepared. The first housing 30 waits for next work in a state where the first holding groove 31 and the second holding groove 32 face upward.

[Housing of Sensor Intermediate Bodies (FIGS. 4B and 4C)]

Figure 4B:
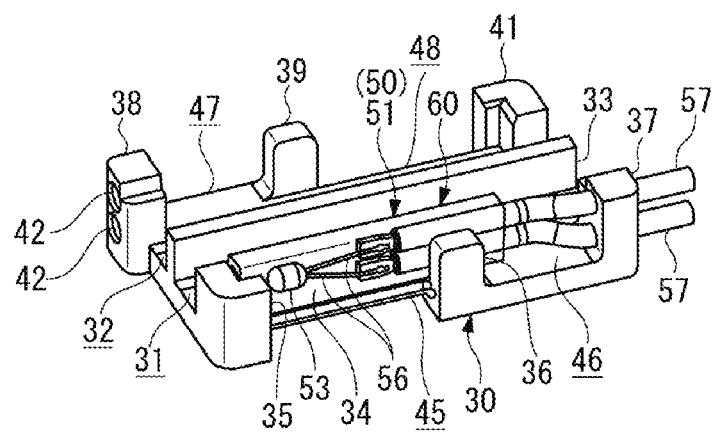
Figure 4C:
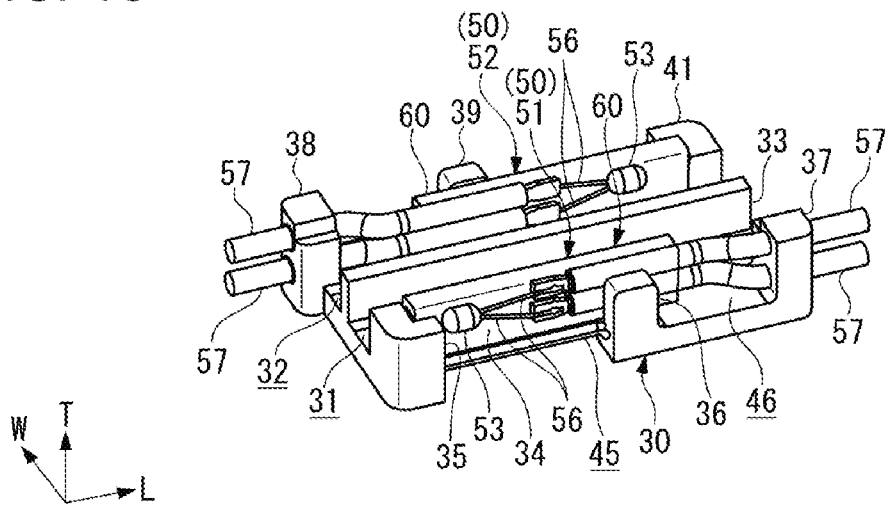

First, as illustrated in FIG. 4B and FIG. 4C, the first sensor intermediate body 51 is housed in the first holding groove 31 and the second sensor intermediate body 52 is housed in the second holding groove 32 in order in the prepared first housing 30.

The first sensor intermediate body 51 is housed in the first holding groove 31 such that the lead wires 57 and 57 are respectively inserted into the electric wire holding holes 42 and 42 of the supporter 37. When the lead wires 57 and 57 are respectively inserted into the electric wire holding holes 42 and 42 and the covering body 60 abuts on the supporting surface of each of the supporter 36 and the supporter 37, the first sensor intermediate body 51 is positioned at a predetermined position of the first holding groove 31.

The second sensor intermediate body 52 is also positioned at a predetermined position of the second holding groove 32 in a similar manner.

Note that, in the first housing 30, side provided with the first sensor intermediate body 51 is referred to as front side, and side provided with the second sensor intermediate body 52 is referred to as inner side.

As illustrated in FIG. 4C, the first holding groove 31 on the inner side from the first sensor intermediate body 51 in the width direction W includes, between the first sensor intermediate body 51 and the partition 33, a space housing the first coil element 11. In addition, as illustrated in FIG. 4C, the second holding groove 32 on the front side of the second sensor intermediate body 52 includes, between the second sensor intermediate body 52 and the partition 33, a space housing the second coil element 12.

[Housing of Coil Elements (FIGS. 5A and 5B)]

Figure 5A:
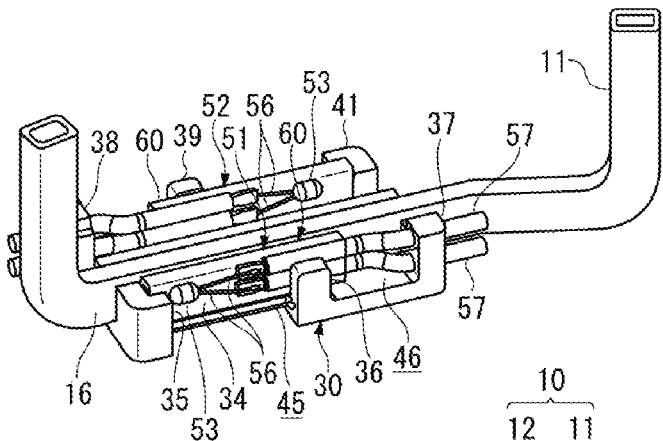
FIGS. 5A to 5C are perspective views illustrating the procedure of manufacturing the temperature sensor according to the present embodiment following FIGS. 4A to 4C, FIGS. 5A and 5B illustrating a state where coil elements are sequentially assembled to the first housing, and FIG. 5C illustrating a state after a second housing is molded by a resin mold.
Figure 5B:
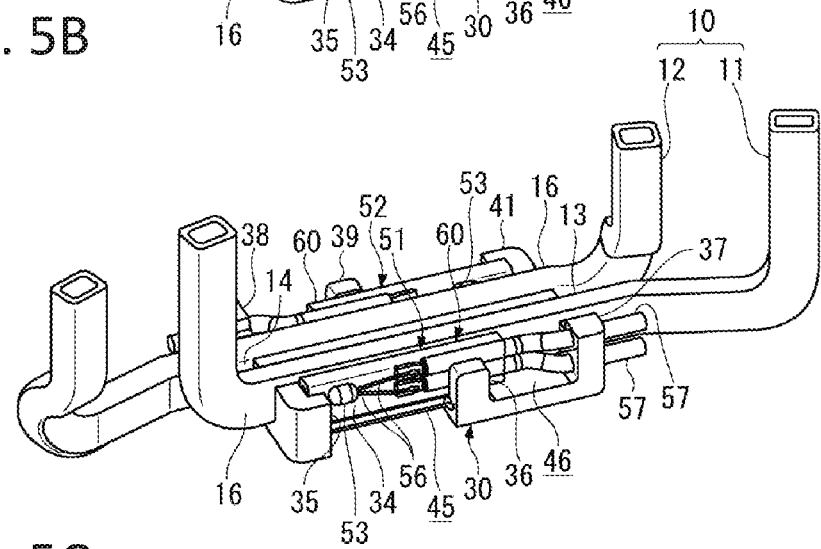

After the first sensor intermediate body 51 and the second sensor intermediate body 52 are housed at the respective predetermined positions of the first housing 30, the first coil element 11 and the second coil element 12 are then respectively housed in the spaces of the first holding groove 31 and the second holding groove 32 as illustrated in FIG. 5A and FIG. 5B.

Dimensions of each of the first holding groove 31 of the first housing 30, the partition 33, the covering body 60 of the first sensor intermediate body 51, and the first coil element 11 are set to house the first coil element 11 in the corresponding space without a gap. The second coil element 12 is housed in a similar manner.

The first coil element 11 housed in the first holding groove 31 is in parallel to the first sensor intermediate body 51, and the second coil element 12 housed in the second holding groove 32 is in parallel to the second sensor intermediate body 52.

Further, the first coil element 11 and the second coil element 12 respectively include a first counter surface 13 and a second counter surface 14 that face each other. The first sensor intermediate body 51 is disposed on rear side of the first counter surface 13 of the first coil element 11, and the second sensor intermediate body 52 is disposed on rear side of the second counter surface 14 of the second coil element 12. Accordingly, the thermosensitive body 54 of the first sensor intermediate body 51 is hardly influenced by heat generation of the second coil element 12, and the thermosensitive body 54 of the second sensor intermediate body 52 is hardly influenced by heat generation of the first coil element 11. Accordingly, the thermosensitive bodies 54 and 54 can detect the corresponding objective temperature with high accuracy. Note that the rear side used in this case corresponds to the outside of each of the first coil element 11 and the second coil element 12, relative to the side (inner side) on which the first coil element 11 and the second coil element 12 face each other.

Assuming that the temperature sensor 1 is used in an environment in which vibration is applied to the temperature sensor 1, a slight interference is provided between the space and the first coil element 11. As a result, fitting the first coil element 11 into the space causes the first coil element 11 and the first sensor intermediate body 51 to press against each other. This generates resistance to the vibration. This is true of the second coil element 12.

The first coil element 11 and the second coil element 12 each have dimensions in the longitudinal direction L larger than the dimensions of the first housing 30, and are respectively housed in the first holding groove 31 and the second holding groove 32 such that both end of each of the first coil element 11 and the second coil element 12 project from the first housing 30.

When a surface as a temperature detection object of the first coil element 11 comes into contact with the covering body 60 of the first sensor intermediate body 51 on the front side in the width direction W, and also abuts on the supporter 35 and the supporter 37, the first coil element 11 is held at the predetermined position in the first housing 30.

In addition, when a surface as the temperature detection object of the second coil element 12 comes into contact with the covering body 60 of the second sensor intermediate body 52 on the inner side in the width direction W, and also abuts on the supporter 38 and the supporter 41, the second coil element 12 is held at the predetermined position in the first housing 30.

[Molding of Second Housing 70]

Figure 5C:
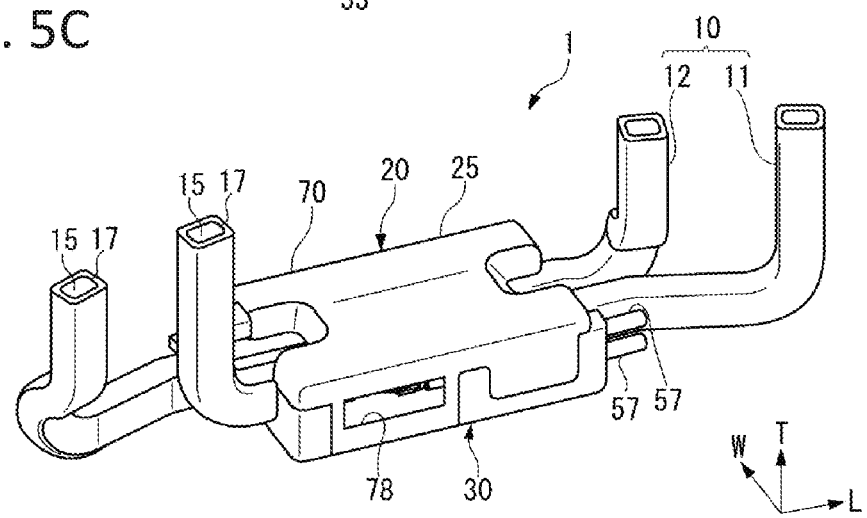

After the first coil element 11 and the second coil element 12 are held by the first housing 30, the second housing 70 is molded through injection molding as illustrated in FIG. 5C. In molding of the second housing 70 by a resin mold, the thermosensitive body 54 including the sealing glass 55 receives considerable pressure, which may cause breakage of the thermosensitive body 54.

The second housing 70 is formed such that the first holding groove 31 and the second holding groove 32 of the first housing 30 are sealed from the outside, and the coil element 10 and the sensor intermediate body 50 housed in the first holding groove 31 and the second holding groove 32 are covered with and hidden by the second housing 70. This prevents the thermosensitive body 54 from being thermally influenced by any part other than the coil element 10, and strengthens the fixing of the coil element 10 and the sensor intermediate body 50.

The second housing 70 is formed to include the view window 78 in the first locking part 74 and the view window 79 in the fourth locking part 77.

The view window 78 penetrates the front and rear surfaces of the first locking part 74, which allows for visual confirmation of the covering body 60 of the first sensor intermediate body 51 from the outside. The view window 78 is provided at a position corresponding to the thermosensitive body 54 of the first sensor intermediate body 51.

The view window 79 penetrates the front and rear surfaces of the fourth locking part 77, which allows for visual confirmation of the covering body 60 of the second sensor intermediate body 52 from the outside. The view window 79 is provided at a position corresponding to the thermosensitive body 54 of the second sensor intermediate body 52.

[Effects]

Effects achieved by the temperature sensor 1 are described below.

In the temperature sensor 1, the first coil element 11 and the second coil element 12 are fixed by the one sensor assembly 20 that includes the first sensor intermediate body 51 and the second sensor intermediate body 52 respectively detecting temperature of the first coil element 11 and the second coil element 12.

Figure 9:
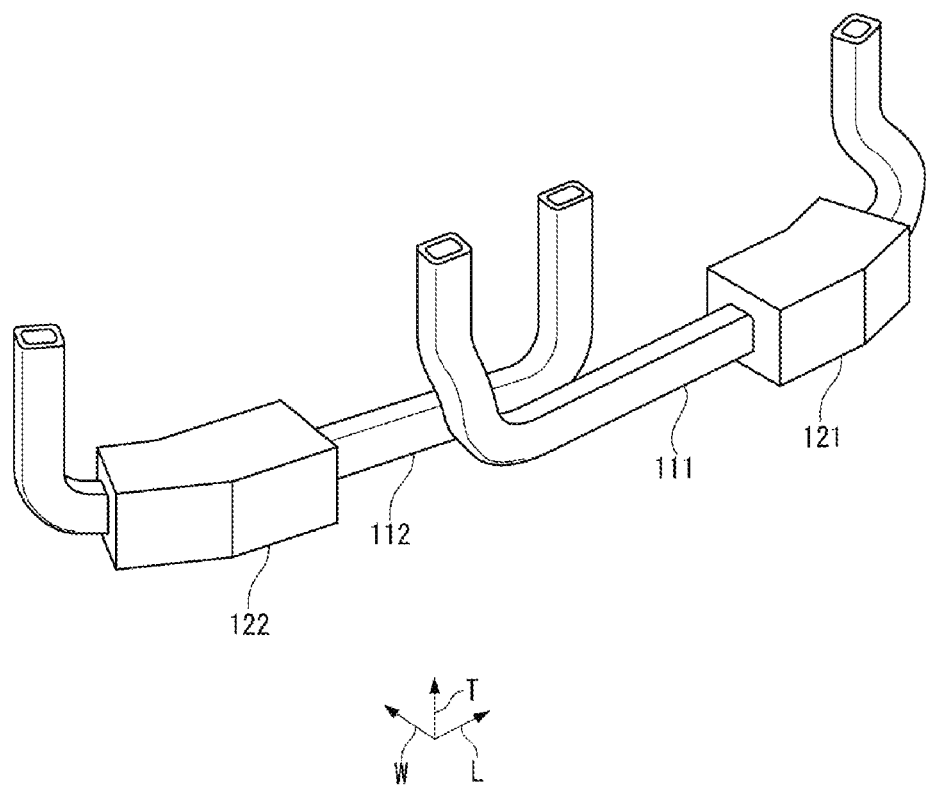
FIG. 9 is a perspective view illustrating a temperature sensor in a comparative example in which sensor assemblies are individually provided for each of two coil elements.

For example, as illustrated in FIG. 9, a first sensor assembly 121 may be provided for a first coil element 111, and a second sensor assembly 122 may be provided for a second coil element 112. In the following, the mode illustrated in FIG. 9 is referred to as a comparative example. When two assemblies of the first sensor assembly 121 and the second sensor assembly 122 are individually provided as separated bodies as with the comparative example, however, the space occupied by the sensor assemblies is accordingly increased.

In contrast, the temperature sensor 1 includes the first sensor intermediate body 51 and the second sensor intermediate body 52 consolidated in one sensor assembly 20. This makes it possible to reduce the space occupied by the sensor assembly, as compared with the case where two sensor assemblies are provided separately.

As for reduction of the occupied space, the dimension in the width direction W or the height direction T may be suppressed since the first sensor intermediate body 51 is in parallel to the first coil element 11, and the second sensor intermediate body 52 is in parallel to the second coil element 12 in the temperature sensor 1.

In addition, consolidation to one sensor assembly 20 as with the temperature sensor 1 is advantageous to vibration as compared with the case where two sensor assemblies 121 and 122 are separately provided as with the comparative example.

In other words, in the temperature sensor 1, the sensor assembly 20 fixes the two coil elements of the first coil element 11 and the second coil element 12 at one position. This makes it possible to suppress vibration as compared with the case where the sensor assemblies 121 and 122 individually vibrate. In addition, the temperature sensor 1 may be suppressed in the entire weight because the first coil element 11 and the second coil element 12 are consolidated in one sensor assembly 20, as compared with the case where the sensor assembly 121 and the sensor assembly 122 are separately provided. This also makes it possible to suppress vibration.

Moreover, consolidation to one sensor assembly 20 as with the present embodiment is advantageous to selection of a position at which the temperature is detected, as compared with the case where the two sensor assemblies are separately provided. In the case where the temperature of the coil of the rotating machine is detected, it is desirable to detect a part where heat is generated most intensely, for the purpose.

In the case where the first sensor assembly 121 and the second sensor assembly 122 are separately provided as with the comparative example illustrated in FIG. 9, the first coil element 111 and the second coil element 112 are provided while being displaced in position in the longitudinal direction L because of the space around the rotating machine to which the two sensor assemblies are assembled. Accordingly, if one of the sensor assemblies, for example, the first sensor assembly 121 is disposed at the part where heat is generated most intensely, the second sensor assembly 122 is inevitably displaced from the part.

In contrast, the temperature sensor 1 includes one sensor assembly 20 consolidated into one place, which makes it possible to bring the thermosensitive body 54 of each of the first sensor intermediate body 51 and the second sensor intermediate body 52 close to the part. Accordingly, it is possible to detect the temperature of the part where the heat is generated most intensely by the corresponding thermosensitive body 54.

Moreover, in the temperature sensor 1, it is possible to assemble the one sensor assembly 20 to the first coil element 11 and the second coil element 12 by single operation. This allows for reduction of man-hours as compared with the case where the one sensor assembly is assembled to one coil element as with the comparative example.

Further, in the temperature sensor 1, the thermosensitive body 54 corresponding to the first coil element 11 is disposed outside the first coil element 11, and the thermosensitive body 54 corresponding to the second coil element 12 is disposed outside the second coil element 12. As described above, the thermosensitive body 54 corresponding to the first coil element 11 is far from the second coil element 12. Therefore, the thermosensitive body 54 corresponding to the first coil element 11 is not influenced by the heat generation of the second coil element 12, and accurately detects the temperature of the first coil element 11. Likewise, the thermosensitive body 54 corresponding to the second coil element 12 also accurately detects the temperature of the second coil element 12. In addition, since the partition 33 is provided between the first coil element 11 and the second coil element 12, it is possible to further suppress influence of the heat generation.

Moreover, according to the temperature sensor 1, the view window 78 is provided at the position corresponding to a range that includes the thermosensitive body 54 and the bonded parts of the extraction wires 56 and the lead wires 57 through welding, and the view window 79 is provided at the position corresponding to a range that includes the thermosensitive body 54 and the bonded parts of the extraction wires 56 and the lead wires 57 through welding of the first sensor intermediate body 51 and the second sensor intermediate body 52. This allows for visual confirmation of soundness of the thermosensitive body 54 including the sealing glass 55 from the outside even after the second housing 70 is formed. Therefore, according to the temperature sensor 1, it is possible to detect a defective thermosensitive body 54 after the second housing 70 is formed and to eliminate the temperature sensor 1.

In addition, the element main body 53 including the thermosensitive body 54 is covered with the transparent covering body 60 in the temperature sensor 1, which allows for visual confirmation of the soundness of the thermosensitive body 54 while protecting the element main body 53.

In addition, since the flat detection surface 65 of the covering body 60 and the flat detection surface 16 of each of the first coil element 11 and the second coil element 12 come into surface contact with each other in the temperature sensor 1, sensitivity with respect to temperature variation of the coil element 10 is enhanced, which contributes to accuracy improvement of the detection temperature.

In particular, the covering body 60 including the fluorine resin is rich in elasticity among resin materials. Therefore, even if the coil element 10 as the temperature detection object vibrates, the covering body 60 follows the vibration and is tightly pressed against the coil element 10. This contributes to accuracy improvement of the detection temperature.

In addition, since the covering body 60 is rich in elasticity, it is advantageous to provide the view windows 78 and 79 in the second housing 70. In other words, to form the view windows 78 and 79 through injection molding, a part of the mold is disposed at the positions respectively corresponding to the view windows 78 and 79, and the part of the mold comes into contact with the covering body 60 housed in the first holding groove 31.

If contact force of the mold and the covering body 60 is weak, the melted resin configuring the second housing 70 enters between the mold and the covering body 60 and covers the view windows 78 and 79, which inhibits visual confirmation of the thermosensitive body 54.

Even if the contact force of the mold and the covering body 60 is strong, the covering body 60 according to the present embodiment is not broken because the covering body 60 is rich in elasticity. For example, if the covering body 60 contains a resin material similar to that of the second housing 70, the covering body 60 may be broken when the contact force of the mold and the covering body 60 is increased. Therefore, it is necessary to strictly adjust the contact force of the mold and the covering body 60.

According to the present embodiment, such adjustment is unnecessary because the covering body 60 is rich in elasticity. This facilitates manufacturing of the temperature sensor 1.

In addition, in the temperature sensor 1, the lead wires 57 and 57 of the element main body 53 are respectively inserted into the electric wire holding holes 42 and 42 of the first housing 30 and are held by the supporter 37. The lead wires 57 and 57 are held by the supporter 37 at a time when the element main body 53 is housed in the first housing 30. Accordingly, the positions of the extraction wires 56 and 56 and the lead wires 57 and 57 are maintained even when the injection molding to form the second housing 70 is performed thereafter. Therefore, the melted resin does not damage the lead wires 57 and 57 even if touching, and the lead wires 57 and 57 may be drawn from the first housing 30.

[First Modification]

The temperature sensor 1 according to the present embodiment includes the first sensor intermediate body 51 disposed on the front side and the second sensor intermediate body 52 disposed on the inner side in the width direction W. The arrangement of the first sensor intermediate body 51 (thermosensitive body 54) and the second sensor intermediate body 52 (thermosensitive body 54) in the present invention, however, is not limited thereto.

Figure 7A:
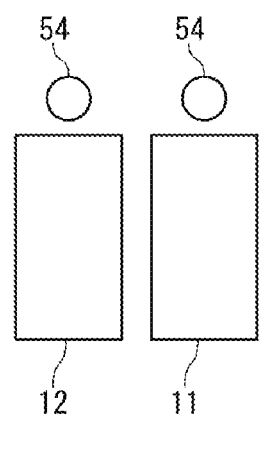
FIGS. 7A to 7D are diagrams each illustrating a first modification in which a position of a thermosensitive body according to the present embodiment is changed.
Figure 7B:
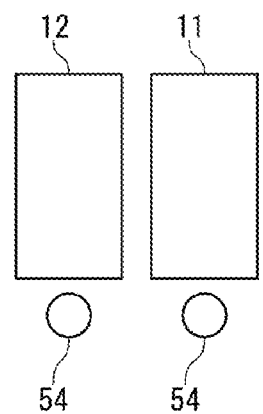

In other words, as illustrated in FIG. 7A, the corresponding thermosensitive body 54 may be provided on an upper side of the first coil element 11 and on upper side of the second coil element 12. Further, as illustrated in FIG. 7B, the corresponding thermosensitive body 54 may be provided on a lower side of the first coil element 11 and on lower side of the second coil element 12. Furthermore, as illustrated in FIG. 7C, the corresponding thermosensitive body 54 may be provided on the upper side of the first coil element 11 and on the lower side of the second coil element 12.

Figure 7C:
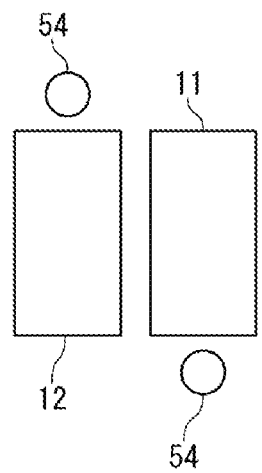
Figure 7D:
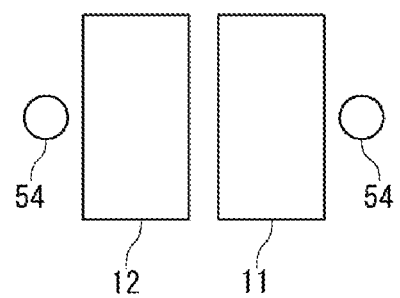

Note that FIGS. 7A to 7C each illustrate only the positional relationship of the first coil element 11, the second coil element 12, and the thermosensitive bodies 54. In addition, FIG. 7B illustrates the positional relationship thereof in the above-described temperature sensor 1.

As described above, the two thermosensitive bodies 54 and 54 may be provided on any of the surfaces of the first coil element 11 and the second coil element 12 except for the first counter surface 13 and the second counter surface 14 that face each other. Moreover, the thermosensitive bodies 54 and 54 may be provided at optional positions in consideration of, for example, the space around the rotating machine to which the temperature sensor 1 is assembled.

In this case, in the housing 25 of the temperature sensor 1, a boundary between the first housing 30 and the second housing 70 extends along a direction (referred to as lateral direction) in which the first coil element 11 and the second coil element 12 face each other. In the present invention, however, the boundary between the first housing 30 and the second housing 70 may extend along a vertical direction orthogonal to the lateral direction.

[Second Modification]

Figure 8A:
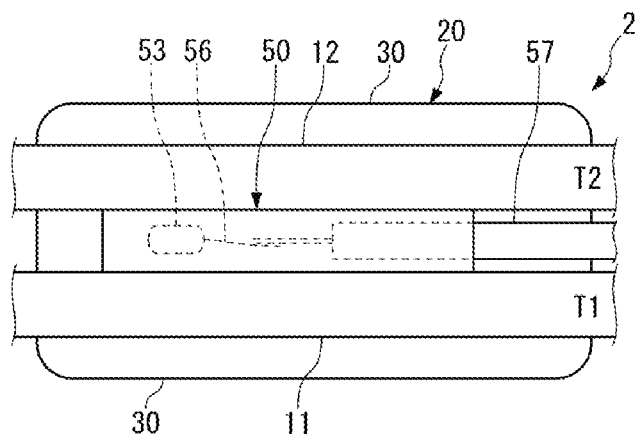
FIGS. 8A to 8C each illustrate a temperature sensor according to a second modification of the present embodiment, FIG. 8A being a plan view illustrating the temperature sensor from which a second housing is removed, FIG. 8B being a plan view, and FIG. 8C being a side view.
Figure 8B:
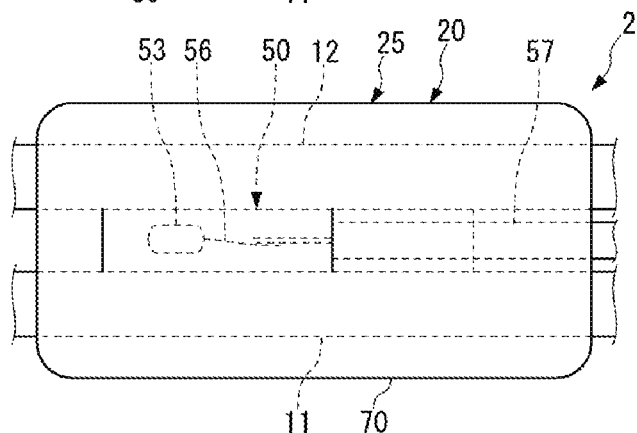
Figure 8C:
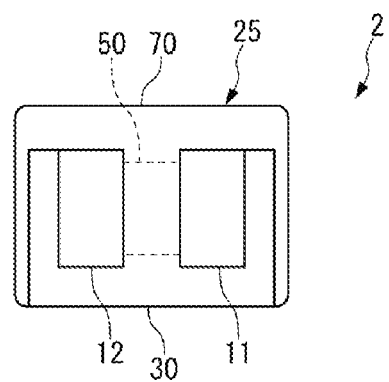

The temperature sensor 1 according to the present embodiment includes the first sensor intermediate body 51 and the second sensor intermediate body 52 that respectively correspond to the first coil element 11 and the second coil element 12, and individually detects the temperature of the first coil element 11 and the temperature of the second coil element 12 as an assumption. The present invention, however, is not limited thereto. In other words, the present embodiment provides a temperature sensor 2 in which only one sensor intermediate body 50 is disposed between the first coil element 11 and the second coil element 12 as illustrated in FIGS. 8A to 8C. The temperature sensor 2 is in common with the temperature sensor 1 in that the one sensor assembly 20 holds both of the first coil element 11 and the second coil element 12.

The temperature sensor 2 is influenced by two temperatures of temperature T1 of the first coil element 11 and temperature T2 of the second coil element 12. Therefore, detection temperature Td appears as an average value ((T1+ T2)/2) of the temperature T1 and the temperature T2.

When the temperature T1 and the temperature T2 are both within a normal temperature range $\Delta Tn$, the detection temperature Td is also within the temperature range $\Delta Tn$. For example, if one or both of the temperature T1 and the temperature T2 are deviated from the temperature range $\Delta Tn$, the detection temperature Td is also deviated from the temperature range $\Delta Tn$.

Accordingly, the temperature sensor 2 can detect abnormality of the heat generation temperature of one or both of the first coil element 11 and the second coil element 12 even though the temperature sensor 2 includes one sensor intermediate body 50, namely, only one thermosensitive body 54. This makes it possible to suppress its cost.

In addition, in the temperature sensor 2, the sensor intermediate body 50 is interposed between the first coil element 11 and the second coil element 12, and serves as the partition 33 of the temperature sensor 1. This makes it possible to eliminate installation of the partition 33. Accordingly, it is possible to suppress the dimension of the temperature sensor 2 in the width direction W.

The preferred embodiment of the present invention has been described above. Other than the above, the configurations described in the above-described embodiment may be selected or appropriately modified without departing from the scope of the present invention.

In addition, in the present embodiment, the example in which the view windows 78 and 79 are provided in the second housing 70 including the resin molded body has been described; however, the present invention is not limited thereto. The view windows 78 and 79 may be provided in the first housing 30 that is previously prepared as an injection molded product, or may be provided in both of the first housing 30 and the second housing 70.

In this case, the view windows 78 and 79 are formed at a time when the first housing 30 is formed through injection molding.

Further, in the present embodiment, the example in which the most part of the element main body 53 including the thermosensitive body 54 is covered with the covering body 60 including the fluorine resin has been described. The covering body 60, however, is optional in the present invention, and the covering body 60 may include other transparent resin material, or may not be provided.

Further, in the present embodiment, the element main body 53 of the first sensor intermediate body 51 is opposite in direction to the element main body 53 of the second sensor intermediate body 52. The present invention, however, is not limited thereto, and the element main body 53 of the first sensor intermediate body 51 and the element main body 53 of the second sensor intermediate body 52 may be provided in the same direction.

REFERENCE SIGNS LIST

1, 2 Temperature sensor
10 Coil element
11 First coil element
12 Second coil element
15 Conductor
16 Detection surface
17 Covering
20 Sensor assembly
25 Housing
30 First housing 31 First holding groove
32 Second holding groove
33 Partition
34 Bottom floor
35, 36, 37 Supporter
38, 39, 41 Supporter
42 Electric wire holding hole
45, 46, 47, 48 Gap
50 Sensor intermediate body
51 First sensor intermediate body
52 Second sensor intermediate body
53 Element main body
54 Thermosensitive body
55 Sealing glass
56 Extraction wire
57 Lead wire
58 Covering layer
60 Covering body
61 Inner layer
63 Outer layer
65 Detection surface
70 Second housing
71 Base part
74 First locking part
75 Second locking part
76 Third locking part
77 Fourth locking part
78, 79 View window
L Longitudinal direction
W Width direction
T Thickness direction

The invention claimed is:

1. A temperature sensor, comprising:
a first coil element and a second coil element both serving as a part of a coil of an electric apparatus;
an element main body that includes a thermosensitive body detecting temperature of the first coil element and temperature of the second coil element, and a pair of electric wires connected to the thermosensitive body;
an electrically insulating covering body that covers the thermosensitive body and at least a part of the electric wires; and
a housing that includes an electric insulating resin material, and is configured to house and hold the first coil element, the second coil element, the element main body and the covering body,
wherein the covering body and the first coil element come into surface contact with each other, and the covering body and the second coil element come into surface contact with each other,
wherein the element main body includes a first element main body detecting the temperature of the first coil element and a second element main body detecting the temperature of the second coil element,
wherein the first coil element and the second coil element each include a rectangular cross-section, and respectively include a first counter surface and a second counter surface that face each other,
the first element main body is provided corresponding to any surface of the first coil element other than the first counter surface,
the second element main body is provided corresponding to any surface of the second coil element other than the second counter surface,
wherein the first element main body is provided corresponding to a surface on a rear side of the first counter surface, and
the second element main body is provided corresponding to a surface on a rear side of the second counter surface.

2. The temperature sensor according to claim 1, wherein the housing includes a partition that electrically insulates the first coil element and the second coil element from each other.

3. The temperature sensor according to claim 1, wherein the housing includes, at a position corresponding to the thermosensitive body, a view window allowing for visual confirmation of the thermosensitive body from outside.

4. The temperature sensor according to claim 3, wherein the housing includes a first housing and a second housing both configuring the housing, and
the view window is provided on one or both of the first housing and the second housing.

5. The temperature sensor according to claim 4, wherein the second housing includes a resin molded body with respect to the first housing, and
the view window is provided in the second housing.

6. The temperature sensor according to claim 3, further comprising the covering body that includes a transparent resin and closely covers the thermosensitive body and the part of the electric wires, wherein
the view window is provided at a position corresponding to the thermosensitive body covered with the covering body.

7. The temperature sensor according to claim 3, wherein the element main body includes a first element main body detecting the temperature of the first coil element and a second element main body detecting the temperature of the second coil element, and
the view window is provided corresponding to each of the thermosensitive body of the first element main body and the thermosensitive body of the second element main body.

8. The temperature sensor according to claim 1, wherein the covering body is of a rectangular shape.

9. A temperature sensor, comprising:
a first coil element and a second coil element both serving as a part of a coil of an electric apparatus;
an element main body that includes a thermosensitive body detecting temperature of the first coil element and temperature of the second coil element, and a pair of electric wires connected to the thermosensitive body;
an electrically insulating covering body that covers the thermosensitive body and at least a part of the electric wires; and
a housing that includes an electric insulating resin material, and is configured to house and hold the first coil element, the second coil element, the element main body and the covering body,
wherein the covering body and the first coil element come into surface contact with each other, and the covering body and the second coil element come into surface contact with each other, and
wherein the housing further comprises a first holding groove for holding the first coil element and a second holding groove for holding the second coil element.

10. The temperature sensor according to claim 9, wherein the first coil element and the second coil element each include a rectangular cross-section, and respectively include a first counter surface and a second counter surface that face each other, and
the element main body is provided between the first counter surface and the second counter surface.

11. The temperature sensor according to claim 9, wherein the housing further comprises a first housing and a second housing, wherein the first housing and the second housing are detachable from each other.

12. The temperature sensor according to claim 9, wherein the pair of electric wires includes a pair of lead wires and a pair of extraction wires.

13. The temperature sensor according to claim 12, wherein each extraction wire includes a dumet wire that is electrically connected to the thermosensitive body through an electrode.

14. The temperature sensor according to claim 12, wherein each lead wire includes a twisted wire in which thin core wires are twisted and is bonded to the corresponding extraction wire.

15. The temperature sensor according to claim 12, wherein each lead wire is connected to a temperature measurement circuit.

16. A temperature sensor, comprising:
a first coil element and a second coil element both serving as a part of a coil of an electric apparatus;
an element main body that includes a thermosensitive body detecting temperature of the first coil element and temperature of the second coil element, and a pair of electric wires connected to the thermosensitive body;
an electrically insulating covering body that covers the thermosensitive body and at least a part of the electric wires; and
a housing that includes an electric insulating resin material, and is configured to house and hold the first coil element, the second coil element, the element main body and the covering body,
wherein the covering body and the first coil element come into surface contact with each other, and the covering body and the second coil element come into surface contact with each other,
wherein the element main body includes a first element main body detecting the temperature of the first coil element and a second element main body detecting the temperature of the second coil element, and
wherein the housing further comprises a partition at a central axis, the partition separating the first coil element and the second coil element.

* * * * *